May 8, 1951            R. S. BAILEY            2,551,576
GAMMA RAY DIRECTIONAL RECEIVER
Filed Oct. 21, 1947            3 Sheets-Sheet 1
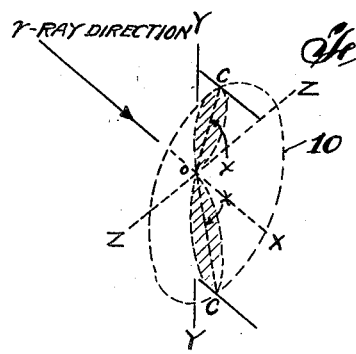
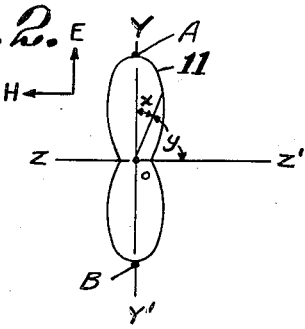
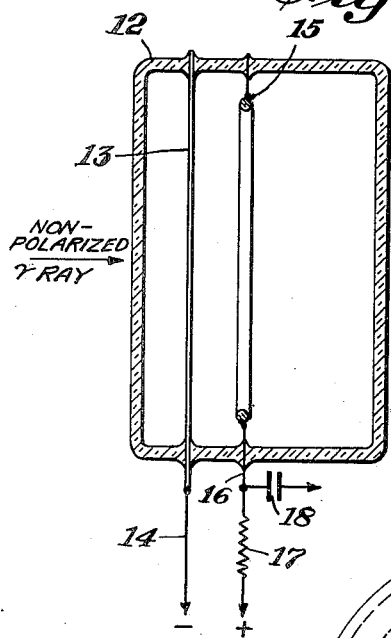
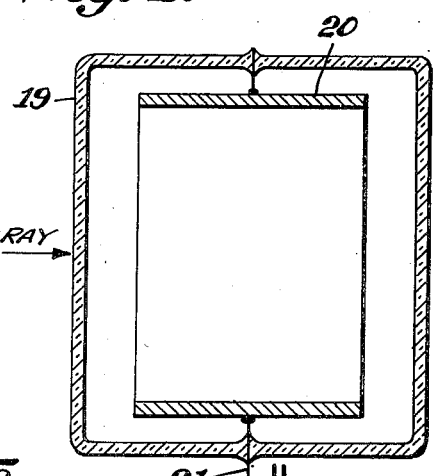
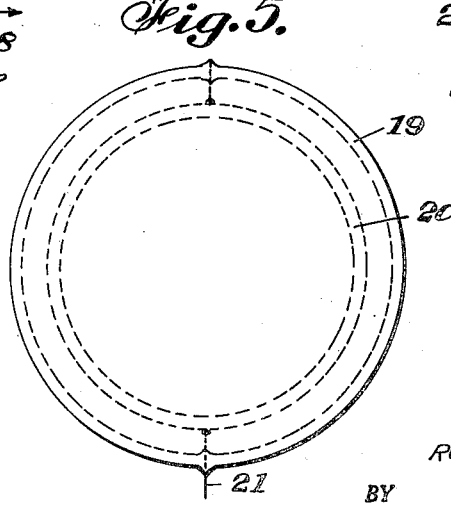
INVENTOR.
ROBERT S. BAILEY
BY
ATTORNEY May 8, 1951            R. S. BAILEY            2,551,576
GAMMA RAY DIRECTIONAL RECEIVER
Filed Oct. 21, 1947            3 Sheets-Sheet 2
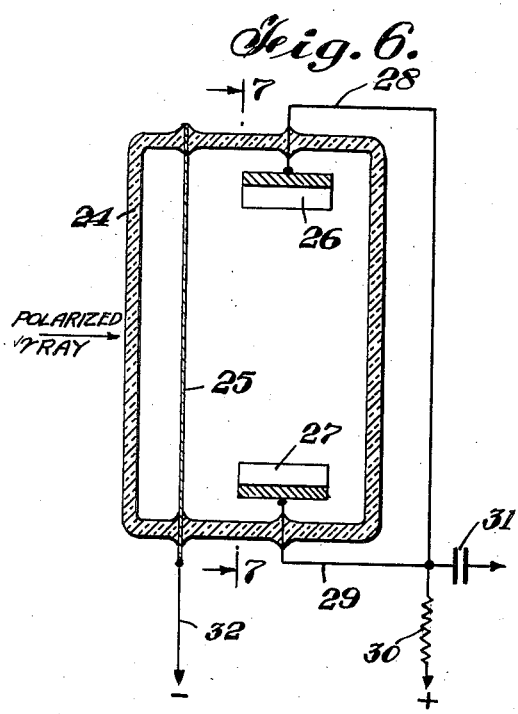
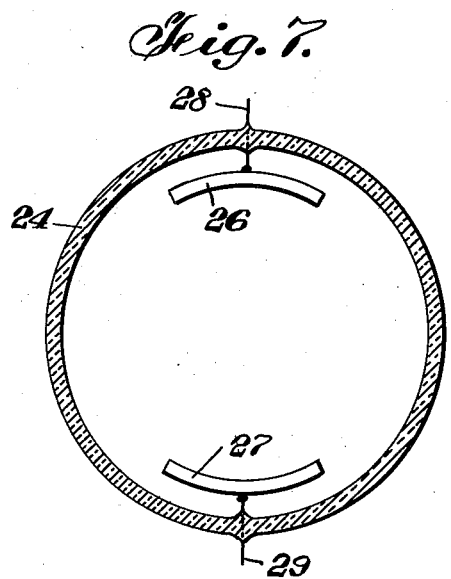
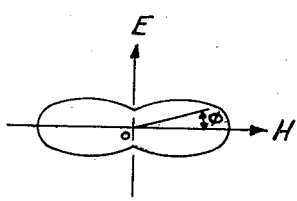
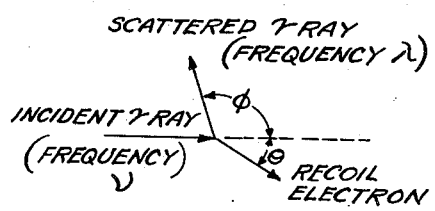
INVENTOR.
ROBERT S. BAILEY
BY
*R. P. Morris*
ATTORNEY

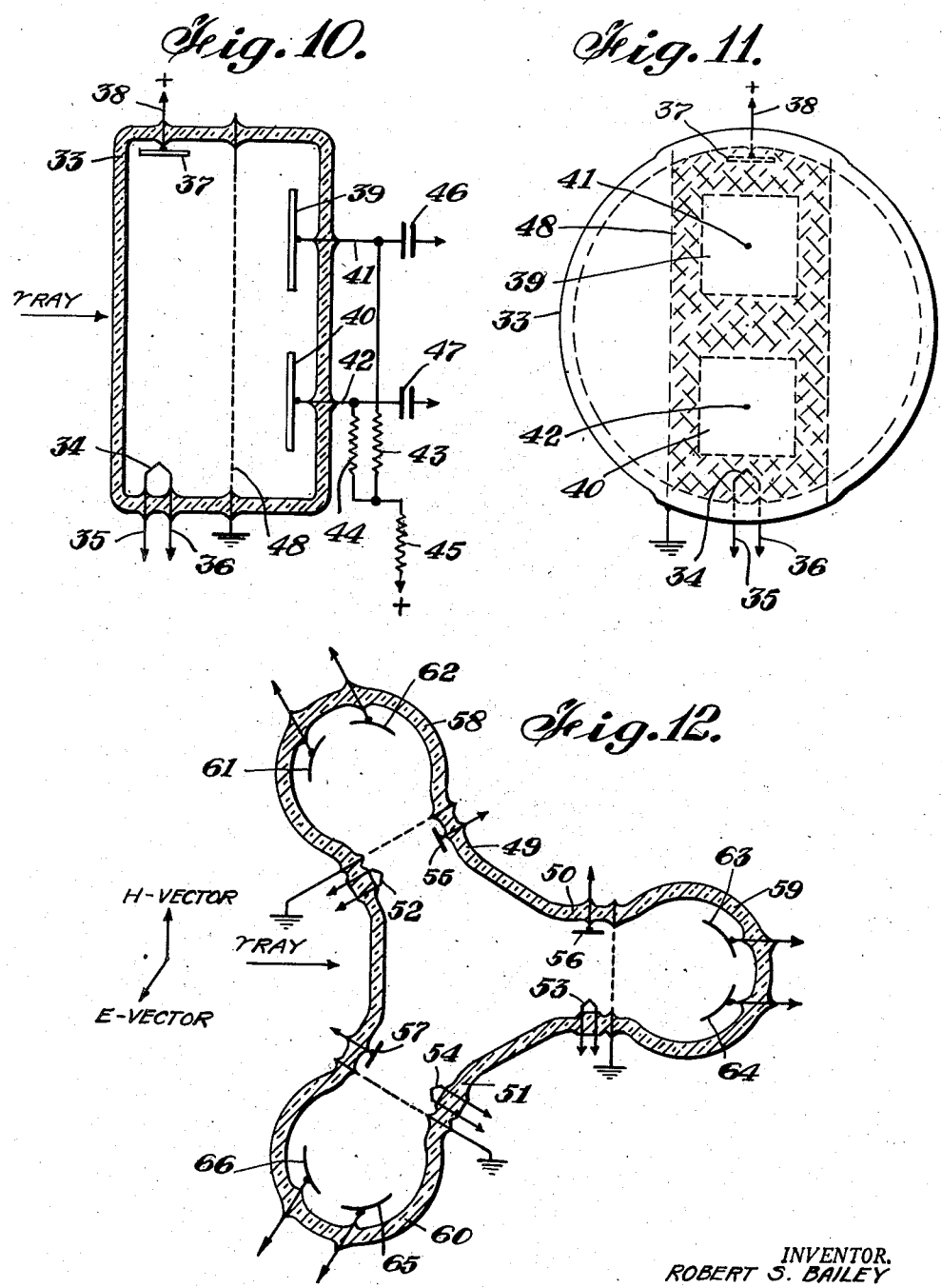

Patented May 8, 1951

2,551,576

UNITED STATES PATENT OFFICE 2,551,576

GAMMA RAY DIRECTIONAL RECEIVER

Robert S. Bailey, New York, N. Y., assignor to International Standard Electric Corporation, New York, N. Y., a corporation of Delaware Application October 21, 1947, Serial No. 781,183

6 Claims. (Cl. 250—27.5)

This invention relates to radiation detecting and receiving systems, and more particularly to systems for directively receiving high energy radiations such as X-rays, gamma rays, cosmic rays, and the like. Directive detection and receiving systems of the prior art have utilized heavy metal shielding provided with an aperture to define a direction, whereas the present invention utilizes certain characteristics of the radiation to be detected or measured in cooperation with a novel structure to define a direction without recourse to the massive shielding of the prior art.

A principal object of the invention relates to a directional detection system for X-rays, gamma rays, cosmic rays, and the like, employing the photoelectric effect.

Another object is to provide an improved directional detector system for X-rays, gamma rays, cosmic rays, and the like, employing the "Compton recoil" effect.

A feature of the invention relates to an evacuated tube device which is selectively responsive to polarized gamma rays.

Another feature relates to an evacuated tube device which is selectively responsive to non-polarized gamma rays.

Another feature relates to a gas-filled tube device which is selectively responsive to polarized gamma rays.

Another feature relates to a gas-filled tube device which is selectively responsive to non-polarized gamma rays.

A further feature relates to a detector tube for directionalized gamma rays, which tube includes a source of free electrons, and an arrangement of electrodes whereby the tube is rendered selectively responsive to directionalized gamma rays by reason of the "Compton recoil" effect.

A still further feature relates to the novel organization and relative disposition and arrangement of parts which cooperate to provide a directionally sensitive detector for gamma rays and similar radiations.

Other features and advantages will be apparent as the description ensues.

In the drawing which shows, by way of example, certain preferred embodiments of the invention, there is shown in Fig. 1 a perspective diagram explanatory of the invention.

Fig. 2 is a three coordinate diagram explanatory of the invention.

Fig. 3 is an illustration of an evacuated tube embodying the invention.

Fig. 4 is an illustration of a gas-filled tube embodying the invention.

Fig. 5 is an end view of the tube of Fig. 4.

Fig. 6 illustrates a modification of the tube of Fig. 3.

Fig. 7 is an end view of the tube of Fig. 6.

Fig. 8 is a polar diagram explanatory of the operation of a modified gamma ray detector.

Fig. 9 is a vector diagram to supplement the polar diagram of Fig. 8.

Fig. 10 is a schematic representation of a gamma ray detector tube employing the "Compton recoil" effect.

Fig. 11 is another view of the tube of Fig. 10.

Fig. 12 is a modification of the tube of Figs. 10 and 11.

It is known that gamma radiation produces electrons by three distinguishable processes, namely, (1) Pair production;
(2) Photoelectric effect;
(3) "Compton recoil" effect.

The present invention provides apparatus and arrangements for utilizing the photoelectric effect of gamma radiations and the "Compton recoil" effect of gamma radiations of the type described in the book, "Photo-Electric Phenomena" by Hughes and DuBridge, First Edition, 1932, at pages 404 through 418. It is known that when a surface such as a metal foil or film is subjected to the action of high energy radiation, such for example as gamma rays, there are engendered from the surface of the metal, electrons whose spacial distribution and density have a pronounced directional characteristic with respect to the direction of the incident radiation. It has been known for some time that when thin metal films are subjected to gamma rays a considerably greater number of photoelectrons are ejected from the emergent face of the film as compared with those from the face of the film upon which the radiation impinges. Thus, referring to Fig. 1, there is shown a perspective view illustrating the distribution of the photoelectrons from the emergent face of a metal film which is being subjected to unpolarized gamma radiation travelling in the OX direction. In other words, the film is, in Fig. 1, assumed to lie in the OYZ plane, and the gamma radiation is travelling perpendicular to this plane. The distribution of the photoelectrons is then represented by the solid figure 10 which is assumed to be plotted in polar coordinates. From this graph it will be seen that most of the photoelectrons are ejected in a direction different from the direction of the incident gamma ray beam. In general, the maximum distribution will be along the coordinate OC where the polar angle $x$ is approximately between 60° and 80°. For such unpolarized gamma ray beams, the polar diagram of Fig. 1 will be rotationally symmetrical about the OX axis as shown.

On the other hand, when a beam of polarized gamma rays is used, a second directivity effect is produced. Thus, as shown in Fig. 2, if the OX axis is assumed to be perpendicular to the paper, and if the polarized beam of gamma rays is travelling in the OX direction, the projection of the distribution of the ejected electrons will be in the OYZ plane. It can be shown that the direction of the E vector of polarized incident rays causing this distribution is parallel to the OY axis, and the direction of the H vector of this radiation will be parallel to the OZ axis. It can also be shown that the directivity diagram of Fig. 2 is substantially independent of the frequency of the incident rays. In the event that the photoelectrons are produced by the action of the gamma rays on a layer of gas atoms, as distinguished from a metal film, it can be shown that the directivity diagram of Fig. 2 is substantially independent of the nature of the gas atoms from which the electrons are ejected. Furthermore, the polar diagram of Fig. 2 follows very closely the formula $\cos^2 x$, where $x$ is the angle between the initial direction of the electron track and the direction of the electric vector E. From this diagram it will be seen that there is a marked concentration of photoelectrons in the direction of the electric vector E, the more complete the polarization of the gamma rays, the more or the photoelectrons concentrated in the said direction of the electric vector.

Referring to Fig. 3, there is shown a detector tube which makes use of the electron distribution pattern of Fig. 1, so as to respond selectively to certain directionalized gamma rays. In Fig. 3, the numeral 12 represents an evacuated glass envelope across the interior of which is mounted a metallic film 13 which is provided with a suitable lead-in 14 for applying a suitable negative potential to the film. Also mounted within the envelope 12 in spaced relation to the film 13 is a ring-like electrode 15 of metal or other suitable conductive material which is so located that it coincides with the region of maximum distribution of the photoelectrons corresponding to the circular maximum represented by the polar coordinate OC (Fig. 1), it being assumed that the tube 12 is properly oriented with respect to the direction of the incident gamma rays as represented by the arrow, so that the direction of the gamma ray beam passes approximately through the center of the film 13 and the center of ring 15. The ring 15 is provided with a suitable lead-in 16 which can be connected through a suitable high resistance 17 to the positive terminal of any suitable D. C. power supply. The upper terminal of resistor 17 can then be connected through a coupling condenser 18 to a suitable amplifier or indicator.

Because of the directional character of the ejected electrons, if the incident gamma ray beam is not directed at the proper angle with respect to the film 13, very little, if any, substantial quantity of electrons will be collected by the ring 15. By this means therefore, it is possible to render the device 12 rather sharply responsive to certain directionalized gamma ray beams, while rendering it substantially unresponsive to other directionalized beams.

Instead of employing a metallic film to produce the ejected electrons, a similar result can be obtained by omitting the film and by filling the tube with a gas. Such an arrangement is illustrated in Fig. 4 wherein the enclosing envelope 19 contains a filling of a gas or vapor and the electron collector electrode 20 may be in the form of a cylinder which extends for a substantial distance along the longitudinal axis of the tube 19. The electrode 20 is provided with a suitable lead-in 21 which can be connected from a suitable high resistance 22 to the positive terminal of a D. C. power supply, the resistance 22 being coupled by a condenser 23 to an amplifier or indicator.

Fig. 5 is an end view of the tube of Fig. 4.

Referring to Fig. 6, there is shown a tube which is selectively responsive to directionalized gamma ray beams of the polarized type. The device of Fig. 6 comprises an evacuated envelope 24 within which is mounted a suitable metallic film 25. However the electron collector electrode system, instead of being in the form of a ring, comprises two separate conductive ring segments 26, 27, which are provided with respective lead-ins 28, 29, and connected in common through the high value resistor 30 to the positive terminal of the D. C. power supply, the resistor 30 being coupled through condenser 31 to any suitable amplifier or indicating device. These electrodes 26, 27, are located respectively at the maximum regions OA, OB, of the directional pattern represented in Fig. 2. The film 25 is connected through a suitable lead-in 32 to the negative terminal of the D. C. power supply.

In the devices of Figs. 3 to 7, the ejected electrons are in a bound condition within the metal film or gas layer that is acted upon by the gamma rays. It is known, however, that free electrons, such for example as those produced by a thermionic cathode, absorb energy from gamma radiations, and in doing so they give rise to other gamma rays of lower frequency. Such electrons are known as "Compton recoils." It is possible, therefore, to take advantage of this effect to devise a directional detector.

It is known that in connection with gamma rays and free electrons, the lateral distribution of the velocities of the recoil electrons in the E-vector plane and the H-vector plane of the impinging gamma ray is a maximum in the horizontal directions, as represented by the polar diagram of Fig. 8. In this diagram it is assumed that the gamma rays are traveling perpendicularly into the plane of the paper, and the velocities at any particular point of the diagram are proportional to $\cos^2 \phi$ or polar angle. It is also known that all electrons are ejected substantially within the boundary of a cone in the longitudinal plane. It is also known that the following formula shows the relation between the angle $\phi$ of the scattered gamma ray and the angle $\theta$ of the recoil electron:

$$\tan \frac{\phi}{2} = \frac{-1}{[1 + (h\nu/mc^2)] \tan \theta} \quad (1)$$

Fig. 9 shows in another form the relations between the incident gamma ray direction, the scattered gamma ray, and the recoil electron. Concomitant with this phenomenon is the change in wavelength of the gamma radiation from $\gamma$ to $\gamma'$ of the scattered gamma ray in accordance with the following equation:

$$\lambda^1 - \lambda = \frac{h}{mc}(1 - \cos \phi) \quad (2)$$

wherein $h$ is Planck's constant, $c$ is the velocity of light, and $m$ is the electronic mass.

Referring to Fig. 10, there is shown a directionally-sensitive detector tube which utilizes the characteristic directional grouping of the recoil electrons with respect to the H vector and also the above-noted angular relation formula. This tube comprises for example an evacuated glass bulb or envelope 33. Suitably mounted within the bulb is a thermionic emitting cathode or filament 34 having suitable lead-ins 35, 36, for connection to a source of heating current. Mounted in spaced opposing relation to the cathode 34 is an anode 37 which likewise has a suitable lead-in 38 for connection to the positive terminal of a suitable D. C. power supply. Mounted at the opposite end of the tube are a pair of electron collector electrodes 39, 40, each of which is provided with a suitable lead-in 41, 42, and connected through respective series resistors 43, 44 and a common series resistor 45, to the positive terminal of the D. C. power supply. The electrodes 39 and 40 are coupled through respective coupling condensers 46, 47, to a suitable measuring circuit, for example a differential or balanced amplifier (not shown) of any well-known design. When the electrodes are suitably energized and connected as shown, there is produced between the cathode 34 and the anode 37 a plane or lamina of free electrons. In order fully to utilize the "Compton recoil" effect in the tube 33, it is important that the potential on the electrodes 39 and 40 have very little effect in disturbing the electron distribution crosswise between the cathode 34 and the anode 37. For this purpose, there is provided a grid or screen electrode 48 which can be connected to ground. When using the tube 33 as a directionally-sensitive gamma ray detector, it is oriented in such a way that the gamma rays to be detected are travelling in a direction substantially perpendicular to the sheet of electrons between the cathode 34 and the anode 37, and preferably so that the gamma ray beam is symmetrical with respect to the said cathode and anode and with respect to the electrodes 39 and 40.

Since nearly all the recoil electrons resulting from the interaction between the gamma rays and the free electrons possess an angle which is less than 45°, the collector electrodes 39, 40, should be located so that they do not subtend with respect to the intersection of the gamma ray beam and the sheet of free electrons, an angle greater than 45°.

In addition, it is possible to utilize the scattered gamma rays to produce additional recoil electrons and thus to increase the directional sensitivity of the tube. Since the recoil angle $\theta$ is less than 45°, the angle of the scattered rays $\phi$ lies between 180° and $$2 \tan^{-1} \frac{-1}{(1+h\nu/mc^2)}$$

This latter angle can be calculated knowing the frequency $\nu$ of the gamma ray radiation.

There is shown in Fig. 12, in schematic form, a typical detector tube which utilizes scattered gamma rays. This tube comprises an evacuated envelope formed of three similar arms 49, 50, 51. Located in each arm is an electron emitting cathode 52, 53, 54, and respective cooperating anodes 55, 56, 57. The arms, 49, 50, 51, terminate in respective chambers 58, 59, 60, and within each of these chambers is mounted a pair of electron collector electrodes, 61, 62, 63, 64, 65, 66. Each of the sets of collector plates 61—62, 63—64, 65—66, can be connected to respective individual balanced or differential amplifiers, or if desired, they may all be connected in parallel or any other desired combination. With this arrangement, therefore, the directional sensitivity of the device is materially increased since the recoil electrons from the original incident gamma ray beam, as well as the recoil electrons from the scattered gamma ray beam, is utilized because, in effect, three indicators are combined, the portion of the tube at the right of Fig. 12 measuring the recoil electrons from the original ray and the other portions of the tube measuring the recoil electrons from the scattered rays. In using the device of Fig. 12, it can be turned around its central axis until the maximum response is obtained in the output from the various collector electrodes.

While certain particular embodiments have been disclosed herein, it will be understood that various changes and modifications may be made therein, without departing from the spirit and scope of the invention.

What is claimed is:

1. A directionally-sensitive detector for gamma rays and the like comprising an evacuated envelope, means within the envelope for producing a quantity of free electrons having a first path, at least one electron collector electrode adapted to collect recoil electrons resulting from the impingement of the gamma rays on said free electrons, said electron collector electrode being located in the path of said recoil electrons, which latter path is at an angle to said first path.

2. A directionally-sensitive detector for gamma rays, comprising an enclosing envelope, means to develop within the envelope a sheet of free electrons, said envelope being arranged for orientation so that the direction of the incident gamma ray beam is substantially perpendicular to said sheet, an electron collector electrode within said envelope, said collector electrode being located in off-set relation with respect to an axis perpendicular to said sheet and in the path of recoil electrons resulting from impingement of said gamma ray beam on said sheet of free electrons.

3. A directionally-responsive gamma ray detector, comprising an evacuated envelope, an electron-emitting cathode, and an anode within said envelope for developing therebetween a sheet of free electrons, a plurality of anodes within said envelope and mounted so as to be symmetrically located on opposite sides of an axis perpendicular to said sheet of electrons, said anodes also being located in the path of recoil electrons resulting from impingement of the gamma ray beam on the said sheet of free electrons the number of recoil electrons in said path being greatest when said gamma ray beam is perpendicular to said sheet.

4. A detector according to claim 3, in which a foraminous electrode is located between said anodes and said sheet of free electrons, said foraminous electrode being electrically biassed to screen said sheet of free electrons from the field of said anodes.

5. A detector according to claim 3, in which said anodes are positively biassed with respect to said sheet of free electrons, and a grid is located between the anodes and said sheet, said grid being negatively biassed with respect to the anodes.

6. A directionally-responsive detector for gamma rays, comprising an evacuated enclosing envelope, an electron-emitting cathode, and an anode within said envelope for developing therebetween a sheet of free electrons adapted to be subjected to a beam of gamma rays to develop directionalized recoil electrons whose directional distributions is determined by the angular relation between the incident gamma ray beam and the sheet of free electrons, a plurality of anodes for collecting the recoil electrons and located at regions corresponding to the maximum distribution of said recoil electrons, and a grid between the sheet of electrons and said anodes to maintain the formation of said electron sheet independent of the potential of said anodes.

ROBERT S. BAILEY.

REFERENCES CITED

The following references are of record in the file of this patent:

Allen: Physical Review, vol. 55, pp. 966-971, May 15, 1939.

Marshall et al.: Review of Scientific Instruments, vol. 18, No. 7, pp. 504-513, July 1947.